United States Patent Office 2,852,530
Patented Sept. 16, 1958

2,852,530
PROCESS FOR THE PREPARATION OF A PANTO-
THENIC ACID INTERMEDIATE

Jared H. Ford, Kalamazoo, Mich., assignor to The Upjohn Company, Kalamazoo, Mich., a corporation of Michigan No Drawing. Application July 19, 1954
Serial No. 444,375

5 Claims. (Cl. 260—343.6)

The present invention relates to a novel process for the preparation of α - hydroxy-β,β - dimethyl-γ-butyrolactone and is more particularly concerned with the preparation of α,γ-dihydroxy-β,β-dimethylbutyronitrile which is an important intermediate in the preparation of the lactone.

α-Hydroxy-β,β-dimethyl-γ-butyrolactone is an important intermediate in the preparation of pantothenic acid and salts thereof. In the preparation of pantothenic acid and salts thereof, the lactone is reacted with β-alanine or an ester or salt thereof, as more fully discussed by Stiller et al., J. Am. Chem. Soc. 62, 1785 (1940).

In the prior art synthesis of the intermediate, α,γ-dihydroxy-β,β-dimethylbutyronitrile, hereinafter more simply called the cyanohydrin, formoisobutyraldol is prepared by reacting formaldehyde and isobutyraldehyde in the presence of a potassium carbonate catalyst and the resulting aldol is isolated from the reaction mixture. The prior art preparation of the cyanohydrin is then completed by reacting the isolated formoisobutyraldol with a water-soluble cyanide salt in the presence of calcium chloride or sodium bisulfite. The isolation of the formoisobutyraldol is particularly disadvantageous, however, since the aldol condensenation is a reversible reaction and the aldol product tends to revert to the starting materials during separation and purification.

In the present invention it has been found that alkali-metal cyanide and alkali-metal bicarbonate in the presence of water provide suitable conditions for the conversion of formoisobutyraldol to the cyanohydrin.

This discovery is utilized according to the present invention to obviate the need for the isolation of the formoisobutyraldol in the prior art process and as a result better yields of the cyanohydrin are obtained.

Thus by the process of the present invention α-hydroxy-β,β-dimethyl-γ-butyrolactone is prepared by reacting formaldehyde and isobutyraldehyde in the presence of an alkali-metal carbonate catalyst to produce a reaction mixture containing formoisobutyraldol, converting the alkali-metal carbonate to a bicarbonate, adding water an an alkali-metal cyanide to the bicarbonate reaction mixture to prepare the cyanohydrin, and hydrolyzing and lactonizing the resulting cyanohydrin to produce the desired α-hydroxy-β,β-dimethyl-γ-butyrolactone.

The synthesis of formoisobutyraldol is completed by reacting formaldehyde and isobutyraldehyde in the manner outlined by Wessely [Monatsh. 21, 77 (1900)], although higher temperatures than employed by the reference are advantageously used in the present process, e. g., between about 25 and about 45 degrees centigrade.

In the present process, the formoisobutyraldol reaction mixture is advantageously ground to eliminate large lumps and water added to make a suitable slurry, whereupon the alkali-metal carbonate, preferably potassium or sodium carbonate, is converted to an alkali-metal bicarbonate by adding an acid, e. g., hydrochloric, acetic, sulfuric, carbonic, and the like, to the reaction mixture. An additional quantity of alkali-metal bicarbonate is added to the reaction mixture, over and above that which is present by the conversion of the alkali-metal carbonate, so that at least one mole of alkali-metal bicarbonate is present per mole of aldol. An alkali-metal cyanide, advantageously 1.0 to 1.25 moles per mole of aldol, and preferably potassium or sodium cyanide, is thereupon added to the reaction mixture. The conversion of the aldol to the cyanohydrin is completed in the presence of water which can be added separately, or in conjunction with either the additional bicarbonate or alkali-metal cyanide. The reaction is advantageously conducted at a temperature between about minus five to about 45 degrees centigrade, preferably between about zero and ten degrees centigrade. The reaction is completed in a period between about one-half to about three hours, the longer reaction time being required at the lower temperatures. The cyanohydrin separates as an oily layer and can be extracted from the water, but since the compound is rather unstable it is generally advisable not to isolate it.

The cyanohydrin, whether isolated or not, is converted to α-hydroxy-β,β-dimethyl-γ-butyrolactone by conventional procedures such as acid hydrolysis, or alkaline hydrolysis followed by acidification. Acid hydrolysis results in the production of α,γ-dihydroxy-β,β-dimethylbutyric acid which is quickly lactonized to produce α-hydroxy-β,β-dimethyl-γ-butyrolactone. Alkaline hydrolysis produces a salt of the acid and on acidification the lactone is also formed. Hydrolyzing agents include compounds such as sodium carbonate, sodium hydroxide, calcium hydroxide, sulfuric acid, hydrochloric acid, and the like. The acid hydrolysis is preferable because of higher yields.

The resulting α-hydroxy-β,β-dimethyl-γ-butyrolactone can be isolated from the reaction mixture by extracting the mixture with a low-boiling chlorinated hydrocarbon such as methylene chloride, chloroform, ethylene dichloride, and the like. Purification of the isolated lactone is completed by removing the solvent by distillation, and the residual lactone is purified by fractional distillation under reduced pressure.

The following example is illustrative of the process and products of the present invention, but is not to be construed as limiting.

Example 1

A mixture of 811 grams of 37 percent formaldehyde solution and 720 grams of freshly distilled isobutyraldehyde was placed in a 3-liter flask which was surrounded by an ice bath. The solution was stirred rapidly and 50 grams of potassium carbonate (96–98 percent, technical) was added. When the initial reaction had subsided, an additional 450 grams of potassium carbonate was added at a rate such that the temperature was held at about 30 degrees centigrade. The mixture was then stirred for 1½ hours without the ice bath and seeded with solid aldol from a previous run. The stirring was continued until a thick slurry was obtained. This was allowed to harden by standing overnight at room temperature.

The entire reaction mixture was put through a meat grinder to break up the lumps. A mixture of 1.5 kilograms of cracked ice and 1.5 liters of water was added and the resulting slurry was stirred while 300 milliliters of 35 percent hydrochloric acid was added slowly to convert the potassium carbonate to potassium bicarbonate. An additional 706 grams of sodium bicarbonate was then added. A solution of 562 grams of potassium cyanide in one liter of water was then added rapidly. The mixture was stirred for one hour after adding the cyanide. During this time the temperature rose to about 20 degrees centigrade and all of the aldol dissolved in the reaction mixture. Four liters of 35 percent hydrochloric acid were added to the cyanohydrin reaction mixture and the solution was refluxed for 12 hours to produce α-hydroxy-β,β-dimethyl-γ-butyrolactone. The lactone was separated by continuous extraction with methylene chloride. After removal of the solvent by distillation, the residual lactone was vacuum distilled. The yield of crude lactone which boiled from 127–147 degrees at 16 millimeters was 1120 grams. Upon redistillation through an eighteen-inch packed column, 970 grams (75 percent yield) of lactone was obtained; boiling point 116 degrees at 11 millimeters to 126 degrees at 14 millimeters; saponification equivalent, 130.3 (theory=130.1).

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process which comprises reacting isobutyraldehyde and formaldehyde in the presence of an alkali-metal carbonate catalyst at a temperature between about 25 and about 45 degrees centigrade to produce a reaction mixture containing formoisobutyraldol, and converting the formoisobutyraldol to α,γ-dihydroxy-β,β-dimethylbutyronitrile by reacting the formoisobutyraldol in the presence of water with at least one mole of an alkali-metal bicarbonate and at least one mole of alkali-metal cyanide per mole of formoisobutyraldol at a temperature between about minus five and about 45 degrees centigrade.

2. A process which comprises reacting isobutyraldehyde and formaldehyde in the presence of an alkali-metal carbonate catalyst at a temperature between about 25 and about 45 degrees centigrade to produce a reaction mixture containing formoisobutyraldol, adding a mineral acid to the reaction mixture thereby converting the carbonate to bicarbonate, adding an additional quantity of bicarbonate so that at least one mole of bicarbonate is present per mole of formoisobutyraldol, and adding water and at least one mole of an alkali-metal cyanide per mole of formoisobutyraldol to the resulting mixture maintained at a temperature between about minus five and 45 degrees centigrade to produce α,γ-dihydroxy-β,β-dimethylbutyronitrile.

3. A process which comprises reacting isobutyraldehyde and formaldehyde in the presence of potassium carbonate at a temperature between about 25 and about 45 degrees centigrade, adding hydrochloric acid to the reaction mixture thereby converting the carbonate to bicarbonate, adding sodium bicarbonate to the reaction mixture so that at least one mole of bicarbonate is present per mole of formoisobutyraldol, and adding an aqueous solution of sodium cyanide containing at least one mole of sodium cyanide per mole of formoisobutyraldol to the resulting bicarbonate mixture maintained at a temperature between about zero and about ten degrees centigrade to produce α,γ-dihydroxy-β,β-dimethylbutyronitrile.

4. A process which comprises reacting isobutyraldehyde and formaldehyde in the presence of an alkali-metal carbonate catalyst at a temperature between about 25 and about 45 degrees centigrade to produce a reaction mixture containing formoisobutyraldol, converting the formoisobutyraldol to α,γ-dihydroxy-β,β-dimethylbutyronitrile by reacting the formoisobutyraldol in the presence of water with at least one mole of an alkali-metal bicarbonate and at least one mole of alkali-metal cyanide per mole of formoisobutyraldol at a temperature between about minus five and about 45 degrees centigrade and hydrolyzing and lactonizing the resulting α,γ-dihydroxy-β,β-dimethylbutyronitrile to produce α-hydroxy-β,β-dimethyl-γ-butyrolactone.

5. A process for producing α,γ-dihydroxy-β,β-dimethylbutyronitrile which comprises reacting at a temperature between about minus five and about 45 degrees centigrade formoisobutyraldol in the presence of water with at least one mole of alkali-metal cyanide and at least one mole of alkali-metal bicarbonate per mole of formoisobutyraldol.

References Cited in the file of this patent

UNITED STATES PATENTS

| 2,271,872 | Mitchell | Feb. 3, 1942 |
| 2,305,466 | Carter | Dec. 15, 1942 |
| 2,328,000 | Finkelstein | Aug. 31, 1943 |
| 2,443,334 | Van House | June 15, 1948 |

FOREIGN PATENTS

| 597,648 | Great Britain | Jan. 30, 1948 |

OTHER REFERENCES

Lieben: Monatsh. für Chem., vol. 22, pp. 289–312 (1901).

Lieben: Monatsh. für Chemie, vol. 22, pp. 289–313 (1902).

Glaser: Monatsh. für Chemie, vol. 25, pp. 46–54 (1904).